United States Patent

Cocchi et al.

[11] Patent Number: 5,671,662
[45] Date of Patent: Sep. 30, 1997

[54] PASTEURIZER

[75] Inventors: Gino Cocchi; Romano Verardi, both of Bologna, Italy

[73] Assignee: ALI S.p.A. - Carpigiani Group, Italy

[21] Appl. No.: 733,173

[22] Filed: Oct. 17, 1996

[30] Foreign Application Priority Data

Oct. 20, 1995 [IT] Italy ................... GE95A0111

[51] Int. Cl.$^6$ .............. A23L 1/20; A23C 9/00; A61L 2/04; B01F 5/00
[52] U.S. Cl. .............. 99/453; 99/452; 99/460; 366/144; 366/279
[58] Field of Search .............. 99/452–455, 460, 99/458, 483; 62/343, 342, 122; 366/144, 149, 279, 102; 422/21, 22, 24, 25, 304; 426/34, 43, 61, 248, 521

[56] References Cited

U.S. PATENT DOCUMENTS

| | | |
|---|---|---|
| 4,392,361 | 7/1983 | Cavalli . |
| 4,553,759 | 11/1985 | Kilmoyer . |
| 4,618,154 | 10/1986 | Freudenthal . |
| 4,854,743 | 8/1989 | Sexton et al. . |
| 4,858,516 | 8/1989 | Klein . |

FOREIGN PATENT DOCUMENTS

| | | |
|---|---|---|
| 0105586 | 4/1984 | European Pat. Off. . |
| 0106814 | 4/1984 | European Pat. Off. . |
| 0596221 | 5/1994 | European Pat. Off. . |
| 978237 | 4/1951 | France . |
| 2646888 | 11/1990 | France . |
| 806 009 | 3/1951 | Germany . |
| 855 568 | 9/1952 | Germany . |
| 3716862 | 12/1988 | Germany . |
| 2018694 | 10/1979 | United Kingdom . |
| 2031292 | 4/1980 | United Kingdom . |
| 2139106 | 11/1984 | United Kingdom . |
| 90/00233 | 1/1990 | WIPO . |

Primary Examiner—Timothy F. Simone
Attorney, Agent, or Firm—Larson and Taylor

[57] ABSTRACT

Pasteurizer for food products comprising a tank provided with agitator means connected to actuating means, characterized in that said tank has on the bottom a chamber cavity in which said agitator means are accommodated, said chamber being provided on the bottom with a hole which faces, towards the inside of the chamber, the internal cavity of a cylindrical sleeve projecting inside the chamber and fixed thereto, and, towards the outside, the actuating means, said agitator means being provided with a movement transmission shaft which, inserted in the cavity of the sleeve and through the hole on the bottom of the chamber, is coupled to the actuating means, said internal cavity of the sleeve being provided with fluid sealing means.

11 Claims, 3 Drawing Sheets

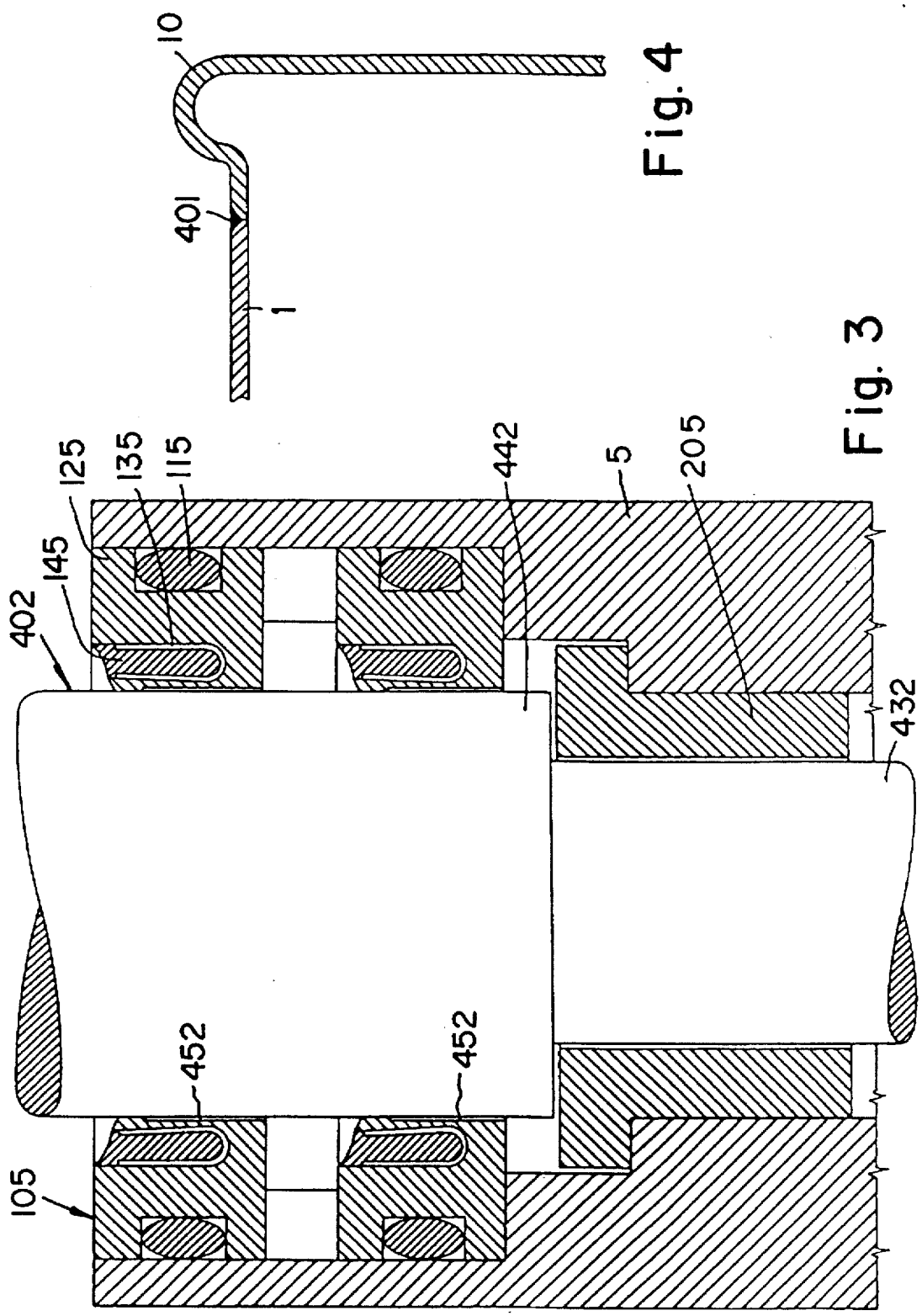

5,671,662

PASTEURIZER

BACKGROUND OF THE INVENTION

The present invention relates to a pasteurizer, in particular for mixtures for ice cream, creams or similar food products.

In the state of the art, there are numerous types of pasteurizer for food products such as mixtures for ice cream, creams or the like, which generally comprise a pasteurization tank associated with heating means, cooling means and mixture circulation means, generally comprising in turn agitator means provided with actuating means. Clearly, since pasteurization of the mixtures for ice cream is a critical production phase with regard to the hygiene of the final product, it is obvious that the hygiene aspect is especially emphasized in the production of such devices.

The pasteurizers of known type have, from this very point of view, a number of disadvantages which are not negligible. In particular, in most pasteurizers, the agitator means which enable the circulation of the mixture in the tank are connected to the actuating means, located outside the tank itself, by means of a perforated sleeve which comes out from the upper edge of the tank, in which there is inserted a shaft communicating with the actuating means, said shaft is in turn connected, by means of a further sleeve or arms which are radial in relation to the shaft, to the agitator means located inside the tank itself. A connection of this type makes the agitator unit difficult to clean, therefore compromising hygiene inside the tank. Furthermore, this system is bulky and complex to assemble and dismantle.

A further shortcoming, from the hygiene point of view, of known pasteurizers lies in the fact that the upper edge of the tank is fixed to the frame of the pasteurizer with fixing means or by welding the superposed rims of the tank and of the frame element, thus creating a step in which perishable production residues can easily be deposited, thereby compromising production hygiene.

SUMMARY OF THE INVENTION

The aim of the invention is therefore to provide a pasteurizer which overcomes the disadvantages encountered in the known devices, allowing a connection of more simple construction and of more effective maintenance between the agitator means and the actuating means.

A further aim of the invention is a pasteurizer in which the pasteurization tank is connected to the frame of the pasteurizer in such a manner that zones of stagnation of the material produced are not created in the tank itself.

The subject of the present invention is therefore a pasteurizer comprising a tank provided with agitator means connected to actuating means, in which said tank has on the bottom a chamber cavity in which said agitator means are accommodated, said agitator means being connected to the actuating means, located outside said tank, by means of a sleeve projecting towards the inside of said chamber, fixed to the bottom of the same and communicating with a hole located on the bottom of the same, said agitator means being provided with a rod which, through said sleeve, is coupled to said actuating means, said sleeve being provided with suitable fluid sealing means.

In one embodiment, said sealing means comprise at least one toroidal element made of elastomeric material, in which an annular metal spring is embedded.

In another embodiment, said chamber is closed by a cover provided with an adequate number of apertures so as to allow the passage of the fluid from the chamber to the tank and vice versa, said cover being coupled to said agitator means and being removable with these from the chamber itself.

In another embodiment, said pasteurization tank is welded to said frame of the pasteurizer in such a manner that the rims of the two parts are coplanar.

BRIEF DESCRIPTION OF THE DRAWINGS

Further advantages and characteristics of the present invention will become clear from the following description of an embodiment of the same, which description is given, for the purpose of non-limiting exemplification, with reference to the attached drawings, in which:

FIG. 3 is a view in enlarged longitudinal section of a detail of FIG. 2, and

FIG. 4 is a view in enlarged longitudinal section of a detail of FIG. 1.

DESCRIPTION OF THE PREFERRED EMBODIMENT OF THE INVENTION

Figure 1:
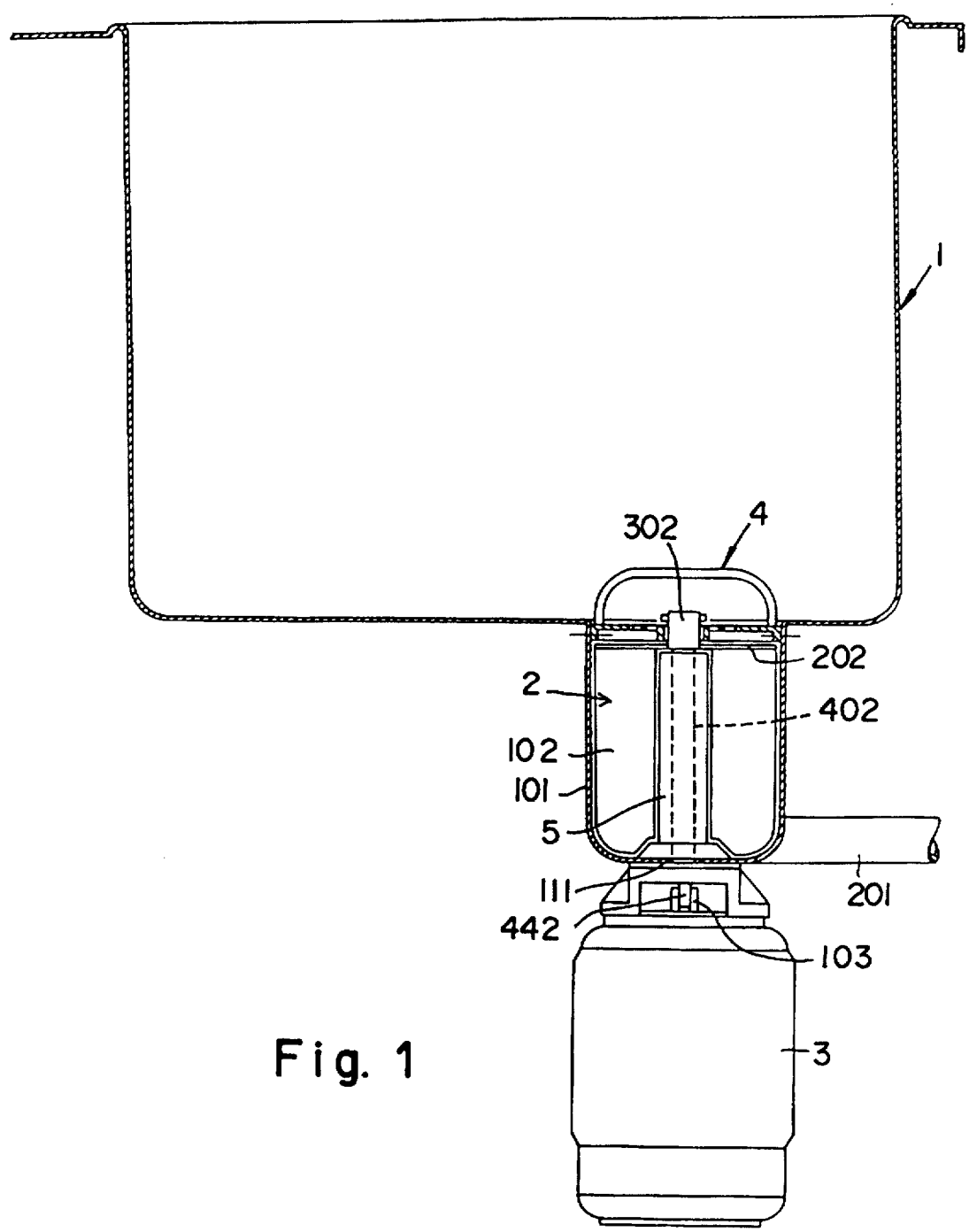
FIG. 1 is a view in longitudinal section of the tank of a pasteurizer according to the invention.

In FIG. 1, 1 designates the pasteurization tank of a pasteurizer according to the invention. Said tank has on the bottom a cylindrical cavity 101, hereinafter known as chamber 101, in which the agitator means 2 are arranged, comprising the blades 102 connected to the arms 202 which branch out from the hub 302. Connected to the hub 302 is a shaft 402, as better illustrated below (see FIG. 2) which, via the sleeve 5, fixed to the bottom of the chamber 101, and the hole 111 on the bottom of said chamber, is coupled to a bush 103 of the actuating means 3 by means of the pin 442. The chamber 101 is closed at the top by a cover 4 coupled, in the manner illustrated and described below, to the hub 302 of the agitator means 2. Furthermore, in the region of its bottom, this chamber 101 is provided with a discharge pipe 201.

Figure 2:
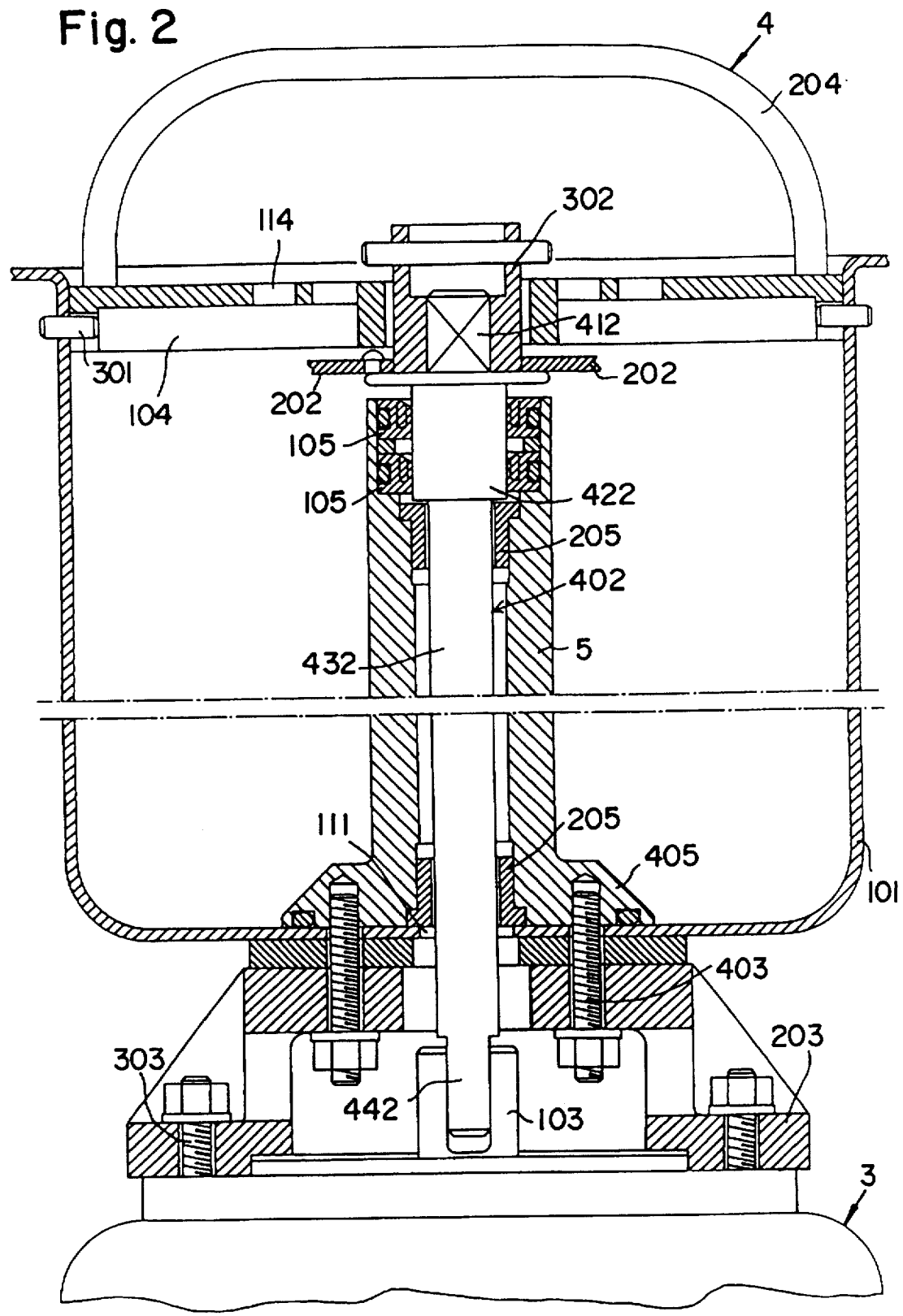
FIG. 2 is a view in enlarged longitudinal section of a detail of FIG. 1.

In FIG. 2, an enlarged detail of FIG. 1 is illustrated, representing the chamber 101. In the figure, the chamber 101 is closed at the top by the cover 4, comprising the handle 204 and the closing top 104 provided with holes 114, which top 104 is coupled to the hub 302 of the agitator means 2 and interacts with the pins 301 emerging radially from the lateral wall of said chamber 101. The sleeve 5 is illustrated in section; said sleeve is passed through by the shaft 402. This shaft, at its end facing the tank 1 of the pasteurizer, is connected, by means of the square key 412, to the hub 302 from which the arms 202 of the blades 102 branch out (not shown in FIG. 2). The head 422 of the shaft 402 interacts with the sealing elements 105 accommodated in the cylindrical cavity of the sleeve 5. The stem 432 of the shaft 402 is of a section smaller than that of the head 422 and passes through the sleeve 5, supported by the two guide bushes 205, until it leaves the chamber 101 through the hole 111 located on its bottom inside said cavity of the sleeve 5. The end of the stem 432 of the shaft 402 facing the actuating means 3 is provided with a pin 442 which is inserted into the bush 103 of the actuating means 3. The actuating means are fixed to the external wall of the chamber 101 by means of the bracket 203 and the fixing means 303 and 403, these latter elements also ensuring the fixing of the sleeve 5 to the chamber 101.

In FIG. 3, an enlarged detail of FIG. 2 is illustrated, showing the sealing of the head 422 of the shaft 402 inside the cylindrical cavity of the sleeve 5. The head 422 of the shaft 402 is surrounded by two sealing elements 105. These elements comprise an annular element 125 made of elastomeric material, hereinafter referred to as ring 125, provided on its lateral wall facing the wall of the cavity of the sleeve with an annular groove in which a sealing element 115, of O ring type, is inserted. Embedded inside the ring 125 is an annular element 135, made of a resilient and for example metal material, hereinafter referred to as spring 135, which is bent so as to assume an outline of essentially U-shaped section, on the inside of which the filling material, which is also elastomeric, is deposited. The head is provided, in the region of its two zones of contact with the sealing elements 105, with two annular covering bands 452, a few microns thick, made of ceramic material or the like, the purpose of which will be described below. The lower end of the head 422 rests on the upper edge of one of the guide bushes 205 in which the stem 432 of the shaft 402 is inserted.

Lastly, FIG. 4 shows the coplanar weld 401 between the rim of the tank 1 and the rim of the frame 10 of the pasteurizer according to the invention.

The operation of the pasteurizer according to the invention will become clear from the following description. The agitator means 2, accommodated in the chamber 101 of the tank 1, once actuated by means of the actuating means 3, to which they are connected in the manner described above, allow the circulation of the food mixture to be pasteurized inside the tank 1. Clearly, a reduction in the dimensions of the movement transmission shaft and of the agitator means has been made possible by special measures adopted in the pasteurizer according to the invention. In fact, in the past, one of the principle reasons why the transmission shaft projected out of the tank was the need to avoid the material to be pasteurized being able to reach the actuating means.

In the present invention, this disadvantage has been overcome with the adoption of the sealing elements 105 which ensure the impermeable sealing of the coupling of the shaft 402 in the sleeve 5. As illustrated in FIG. 3, this is made possible thanks to the particular construction of the sealing elements 105. This is because the spring 135 is positioned in such a manner that it can exert considerable pressure on the rim of the ring 125 facing the head 422 of the shaft 402, thus guaranteeing the necessary sealing. For the purpose of obtaining a particularly effective action on the part of the spring 135, it is expedient for its internal diameter to be slightly greater than the internal diameter of the ring 125; in this manner, the ring 125 rim on which this spring 135 exerts the pressure is quite thin and the action of the spring 135 is intensified. Furthermore, inside the loop of the spring 135, elastomeric material 145 is deposited, which has the dual purpose on the one hand of avoiding the infiltration of product inside the spring 135 and on the other hand of increasing the thrust of the spring towards the head 422 of the shaft 402. Advantageously, so as to limit damage due to wear as a result of the rotation of the shaft 402, in the region of the sealing elements 105, the head 422 of the shaft has been covered with two bands of a layer of a few microns of ceramic material or the like, so as to encourage sliding and limit the wear on the seal made in the manner described above.

Furthermore, it is also very easy to carry out maintenance on the pasteurizer of the invention: by rotating the handle 204 of the cover 4 so as to release the pins 301 of the chamber from the closing top 104 and lifting the same, the shaft 402 slides out of the sleeve and, with it, the blades 102 connected to the hub 302 by means of the arms 202 are removed. The parts to be cleaned are thus easily accessible and of very small dimensions in relation to those of known devices. As illustrated in FIG. 1, the liquid which is used to clean the tank i and the chamber 101 can be discharged through the pipe 201.

Lastly, the connection between the rims of the tank i and of the frame 10 by means of the weld 401 as illustrated in FIG. 4 avoids the formation of any cracks in which the food product would stagnate, and therefore further raises the hygienic level of the pasteurizer. Similarly, the chamber 101 also can be constituted by an element formed independently of the tank and then connected to it with the same type of weld between coplanar rims. Furthermore, conveniently, this chamber 101 can be made by deep drawing of the bottom wall of the tank.

What I claim is:

1. A pasteurizer for food products comprising a tank having a side wall and a bottom wall; a chamber cavity on the bottom wall of said tank; said chamber cavity being in communication with said tank; said chamber cavity being provided at its bottom with a hole; a cylindrical sleeve tightly secured by its lower end to the bottom of said cavity; said sleeve surrounding said hole and extending from the bottom of said cavity up to in proximity of the upper end of said cavity; said cylindrical sleeve being provided at its upper end with sealing elements; a shaft rotatably extending from said hole in the bottom of said cavity through said sleeve and through said sealing elements up to the upper end of said cavity; actuating means coupled to the lower end of said shaft projecting from said hole for rotating said shaft; agitator means secured to the upper end of said sleeve projecting outwardly through said sealing elements; said agitator means extending into said cavity chamber.

2. Pasteurizer according to claim 1, in which said sealing means comprise at least one annular element made of elastomeric material, in which an annular element of essentially U-shaped or V-shaped section made of resilient material is embedded, the concavity of which is filled by elastomeric material which is identical to or different from that of which said annular element is made.

3. Pasteurizer according to claim 2, in which said resilient annular element has an internal diameter slightly greater than the internal diameter of the elastomeric annular element.

4. Pasteurizer according to claim 3, in which said resilient material is a metal material such as steel.

5. Pasteurizer according to claim 2, in which said annular element made of elastomeric material has, on the lateral surface facing the wall of the sleeve, an annular groove in which a band-like sealing element is accommodated.

6. Pasteurizer according to claim 1 in which said shaft of the agitator means, in the region of the zones of contact with said sealing means, is covered with a layer of ceramic material.

7. Pasteurizer according to claim 1 in which said chamber is closed by a cover which is provided with a plurality of apertures and with a handle and is coupled to said agitator means and is removable with these from the chamber itself.

8. Pasteurizer according to claim 7, in which said cover is provided with notches which interact with pins branching out radially from the internal lateral surface of said chamber.

9. Pasteurizer according to claim 1, in which the pasteurization tank is welded to the frame of the pasteurizer in such a manner that the rims of the two parts are coplanar.

10. Pasteurizer according to claim 1, in which said chamber cavity located on the bottom of said tank is made by deep drawing of the bottom.

11. Pasteurizer according to claim 1, in which said chamber cavity comprises a cylindrical element open at one end connected to a hole made on the bottom of said tank, this connection being effected by welding, carried out in such a manner that the rims of the tank and of the cylindrical element, which are welded to one another, are coplanar.

* * * * *